(12) United States Patent
Wilcox et al.

(10) Patent No.: US 11,221,115 B2
(45) Date of Patent: *Jan. 11, 2022

(54) HIGH BAY LUMINAIRE

(71) Applicant: IDEAL INDUSTRIES LIGHTING LLC, Racine, WI (US)

(72) Inventors: Kurt Wilcox, Libertyville, IL (US); Bin Hou, Schaumburg, IL (US)

(73) Assignee: IDEAL INDUSTRIES LIGHTING LLC, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/111,009

(22) Filed: Dec. 3, 2020

(65) Prior Publication Data

US 2021/0116084 A1    Apr. 22, 2021

Related U.S. Application Data

(63) Continuation of application No. 16/416,902, filed on May 20, 2019, now Pat. No. 10,935,196.

(51) Int. Cl.
| | |
|---|---|
| *F21S 8/02* | (2006.01) |
| *F21V 14/00* | (2018.01) |
| *F21V 29/74* | (2015.01) |
| *F21V 5/04* | (2006.01) |
| *F21Y 115/10* | (2016.01) |

(52) U.S. Cl.
CPC ............. *F21S 8/026* (2013.01); *F21V 5/045* (2013.01); *F21V 14/006* (2013.01); *F21V 29/74* (2015.01); *F21Y 2115/10* (2016.08)

(58) Field of Classification Search
CPC .................................................... F21S 8/026
See application file for complete search history.

(56) References Cited

U.S. PATENT DOCUMENTS

| | | | | |
|---|---|---|---|---|
| 8,430,548 | B1 ‡ | 4/2013 | Kelly .................. | G02B 5/0242 362/606 |
| 2005/0201103 | A1 ‡ | 9/2005 | Saccomanno .......... | F21V 7/005 362/34 |
| 2012/0268943 | A1 ‡ | 10/2012 | Walczak .................. | F21V 5/04 362/294 |
| 2013/0329459 | A1 ‡ | 12/2013 | Fisher .................... | G02B 6/009 362/609 |
| 2015/0109779 | A1 ‡ | 4/2015 | Dimitriadis ........... | A01G 7/045 362/23 |
| 2016/0091173 | A1 ‡ | 3/2016 | Camp, III .............. | F21V 13/04 362/24 |
| 2018/0128961 | A1 ‡ | 5/2018 | Lim ........................ | F21V 29/83 |
| 2018/0292071 | A1 ‡ | 10/2018 | Tarsa ...................... | F21V 5/007 |
| 2018/0328553 | A1 ‡ | 11/2018 | Lim ...................... | G02B 6/0038 |

OTHER PUBLICATIONS

International Searching Authority, PCT International Search Report, dated Sep. 3, 2020.‡

‡ imported from a related application

*Primary Examiner* — Vip Patel
(74) *Attorney, Agent, or Firm* — J. Clinton Wimbish; Nexsen Pruet PLLC

(57) ABSTRACT

An optic for a light emitting diode array comprises an arrangement of optical structures for providing one or more down lighting distribution from the LED array; and a waveguide edge for providing one or more up-lighting distributions from the LED array. Luminaires are described comprising a light emitting diode (LED) array and the optic. Lighting systems are described comprising a plurality of the luminaires arranged over an area enclosed by walls.

18 Claims, 14 Drawing Sheets

HIGH BAY LUMINAIRE

RELATED APPLICATION DATA

The present application is a continuation of U.S. patent application Ser. No. 16/416,902 filed May 20, 2019.

FIELD

The invention is generally related to optical devices, and, more specifically, to luminaires employing waveguide optics to provide desired light distributions.

BACKGROUND

Traditional high bay luminaires used in retail stores typically use large source sizes, such as hundreds of mid-power light emitting diodes ("LEDs"), for various economic reasons, including the low cost of such sources. Optical control is needed to direct light emitted from these LEDs to desired locations. Additionally, up-lighting is desirable to illuminate portions of ceiling above the high bay luminaires in order to avoid a cave-like feeling. Elaborate glare reducing features are often included to mask un-shielded light from direct view by customers and employees. While traditional high bay luminaires utilize different design features to provide down lighting and up-lighting, they have largely reached their performance limits. Therefore improvements in performance, visual comfort, and cost, as well as use of user serviceable components are needed.

SUMMARY

In one aspect, optics for use with LED arrays are described herein. An optic, for example, comprises an arrangement of optical structures for providing one or more down lighting distributions from the LED array, and a waveguide edge for providing one or more up-lighting distributions from the LED array. The optic can be a single piece or can comprise two or more pieces. In some embodiments, the optical structures are Fresnel structures, and in other embodiments, single optical structures are positioned over each LED in the LED array. The optical structures can in some cases be micro-scale optical structures ("micro-optical structures"). The arrangement of optical structures can optionally be a radial arrangement. In some cases, the arrangement of optical structures comprises concentric rings. The optical structures can be uniform over the arrangement, or, in other instances, can vary over the arrangement. In some embodiments, the arrangement of optical structures provides a symmetric down lighting distribution. Alternatively, the arrangement of optical structures provides an asymmetric down lighting distribution. The one or more up-lighting distributions provided by the waveguide edge can be symmetric or asymmetric. In some instances when the optic comprises two or more pieces, the each piece can independently have a waveguide edge that provides an up-lighting distribution that is symmetric or asymmetric. Additionally, in some embodiments, a waveguide edge described herein can receive 5 percent to 20 percent of total light produced by the LED array.

In another aspect, luminaire architectures are described herein. In some embodiments, a luminaire comprises a light emitting diode (LED) array, and an optic covering the LED array, the optic comprising an arrangement of optical structures for providing one or more down lighting distributions form the LED array, and a waveguide edge for providing one or more up-lighting distributions from the LED array. As described herein, the arrangement of optical structures can provide a symmetric or asymmetric down lighting distribution. In some cases, the one or more up-lighting distributions provided by the waveguide edge are of a different color than the one or more down lighting distributions provided by the optical structures. The up-lighting and down lighting distributions can be selected independently from one another. The optical structures can be Fresnel structures, or single optical structures position over each LED in the LED array. In some cases, the optical structures are micro-scale optical structures. Moreover, a ratio of max luminance at 65 degrees from nadir to total lumen output from the luminaire can be less than 7, in some cases. Additionally, luminance at 65 degrees from nadir is less than $3 \times 10^5$ cd/m$^2$, in some embodiments. Luminaires described herein can further comprise one or more of a glare shield, a driver assembly, and/or an LED heatsink. The LED heatsink can optionally comprise a plurality of vents positioned proximate the driver assembly.

In another aspect, luminaires described herein comprise a LED array, and an optic covering the LED array, the optic comprising an arrangement of optical structures providing a ratio of max luminance at 65 degrees from nadir to total lumen output from the luminaire of less than 7. The optical structures can be micro-scale optical structures in some cases. In some embodiments, the optical structures have a radial arrangement. The optic can further comprise one or more structures providing one or more up-lighting distributions, and in some cases, the one or more structures is a waveguide edge. The luminaire can further comprise one or more of a glare shield, a driver assembly, and/or an LED heatsink having a plurality of vents proximate the driver assembly.

In a further aspect, lighting systems are provided. In one embodiment, a lighting system comprises a plurality of luminaires having architecture and/or lighting properties described herein arranged over an area enclosed by walls. In some embodiments, each luminaire has a structure previously described herein. In some cases, the optic of the luminaire comprises an arrangement of optical structures for providing one or more down lighting distributions form the LED array, and a waveguide edge for providing one or more up-lighting distributions from the LED array. Optics of luminaires adjacent to the walls can differ from the optics of luminaires over a central region of the area. The optic of luminaires adjacent to the walls, for example, can provide an asymmetric down lighting distribution, and the optic of luminaires over the central region can provides a symmetric down lighting distribution.

These and other embodiments are further described in the detailed description which follows.

DETAILED DESCRIPTION

Figure 1:
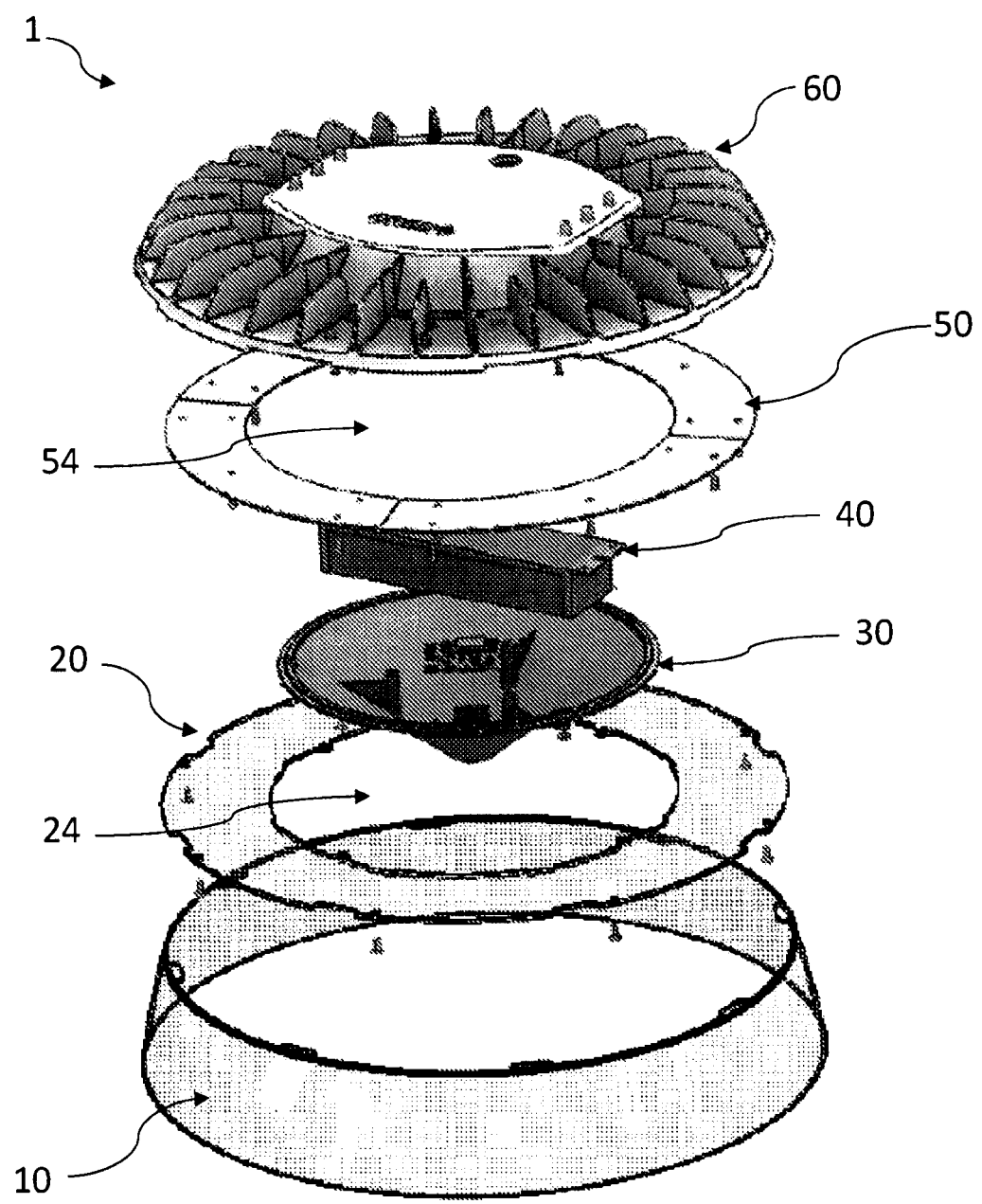
FIG. 1 is an exploded view of a luminaire having an optic according to some embodiments described herein.

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of this disclosure. Numerous modifications and adaptations will be readily apparent to those of skill in the art without departing from the spirit and scope of this disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "top" or "bottom" or "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an" and "the" are intended to include the plural forms as well, unless the context clearly indicates otherwise.

It will be further understood that the terms "comprises," "comprising," "having," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

I. Optics for LED Arrays

In one aspect, optics are described herein employing micro-optical structures and waveguide components for delivery of directional light to wall, ceiling, and/or floor surfaces using down lighting and up lighting distributions. An optic for a light emitting diode ("LED") array is provided comprising a radial arrangement of micro-optical structures for providing one or more down lighting distribution from the LED array, and a waveguide edge for providing one or more up-lighting distributions from the LED array. As described further herein, the optic can provide optical control of light distribution and/or reduced glare.

Turning now to specific components, the optic comprises a plurality of radially positioned micro-optical structures. In some embodiments, the optic is formed as a monolithic or single piece, although in other embodiments, the optic can be formed from two or more pieces. Micro-optical structures described herein can include refractive facets or prisms that collimate or diffuse light to provide one or more down lighting distributions. In some cases, the micro-optical structures have a Fresnel structure, architecture, and/or arrangement. The micro-optical structures can have refractive facets having any slope angle, draft angle, and/or facet spacing consistent with the objective of providing one or more down lighting distributions from an LED array. Each micro-optical structure can have a length in at least one dimension of 1 μm to 500 μm, 50 μm to 400 μm, 100 μm to 300 μm, 100 μm to 200 μm, 100 μm to 150 μm, 150 μm to 300 μm, 200 μm to 300 μm, 50 μm, 100 μm, 150 μm, 200 μm, 250 μm, 300 μm, 350 μm, 400 μm, 450 μm, or 500 μm. Such micron-scale micro-optical structures are contrasted with traditional Fresnel lens structures, which characteristically have lengths in at least one dimension in the millimeter dimensions, such as 1 mm or greater.

In some embodiments, micro-optical structures described herein can have a radial arrangement, such as in concentric rings. The micro-optical structures can be uniform over the radial arrangement in some instances. Alternatively, the micro-optical structures vary in geometry and/or size over the radial arrangement. The radial arrangement of micro-optical structures can control down lighting distribution. For example, in some embodiments, the radial arrangement of the micro-optical structures can provide a symmetric down lighting distribution. In other embodiments, the radial arrangement of the micro-optical structures can provide an asymmetric down lighting distribution.

A waveguide edge described herein can comprise an outer radial edge of the optic. The waveguide edge is oriented to direct light outward in one or more up-lighting distributions. In some cases, the one or more up-lighting distributions is symmetric, and in other cases, the one or more up-lighting distributions is asymmetric. In some embodiments where the optic comprises two or more parts, each respective part can comprise a waveguide edge. For example, when an optic comprises two parts, a first optic and a second optic, the first optic can have a first waveguide edge and the second optic can comprise a second waveguide edge. The first waveguide edge can have the same up-lighting distributions as the second waveguide edge in some cases, or, in other cases, the first and second waveguide edges can have different up-lighting distributions. In some embodiments, the first optic can have a first waveguide edge, but the second optic does not have a waveguide edge, such that the first optic produces both up-lighting and down lighting distributions and the second optic only produces down lighting distributions. In a similar fashion, the first waveguide edge and the second waveguide edge can both have a symmetric up-lighting distribution or an asymmetric up-lighting distribution. Alternatively, the first and second waveguide edges have different up-lighting distributions. In some embodiments, a waveguide edge described herein can direct light outward in one or more up-lighting distributions having an angle of 5°-30°, 10°-25°, 15°-20°, 5°, 10°, 15°, 20°, 25°, or 30° from a plane normal to nadir.

As described in more detail herein, the optic is configured to receive light from an LED array, and the optic can direct a percentage of the received light to the waveguide edge. In some embodiments, the waveguide edge receives up to 5%, up to 7%, up to 9%, up to 10%, up to 12%, up to 14%, up to 15%, up to 16%, up to 20%, 5% to 20%, 8% to 20%, 10% to 20%, 12% to 20%, 14% to 20%, 15% to 20%, 10% to 18%, 10% to 16%, 10% to 15% or 10% to 13% of the total light produced by the LED array. In some embodiments, when micro-optical structures described herein are arranged in concentric rings, one or more of the concentric rings can direct a percentage of received light to the waveguide edge for up-lighting distribution, with the remaining percentage of the light being emitted as one or more down-lighting distributions. In some cases, a portion of light received from only one or more of the concentric rings is directed to the waveguide edge, whereas light from the other concentric rings is emitted as down lighting distributions. For example, as described in more detail herein with reference to FIG. 3, a portion of light received from concentric ring 21e can be emitted from the waveguide edge for up-lighting distribution, whereas light from concentric rings 21a-21d are emitted as downlighting distributions. However, this is merely an example, and in other embodiments, a portion of light received from more than one of the concentric rings 21a-21e can be emitted from the waveguide edge as up-lighting distribution. Thus, in some embodiments, the up-lighting and down lighting distributions can be selected and controlled independently from one another.

An optic described herein having micro-optical structures employing Fresnel architecture can be formed of any light transmissive material of suitable refractive index. In some embodiments, the optic is formed of glass or radiation transmissive polymeric material. Suitable radiation transmissive polymeric materials include acrylics, silicones, or polycarbonates.

Figure 2:
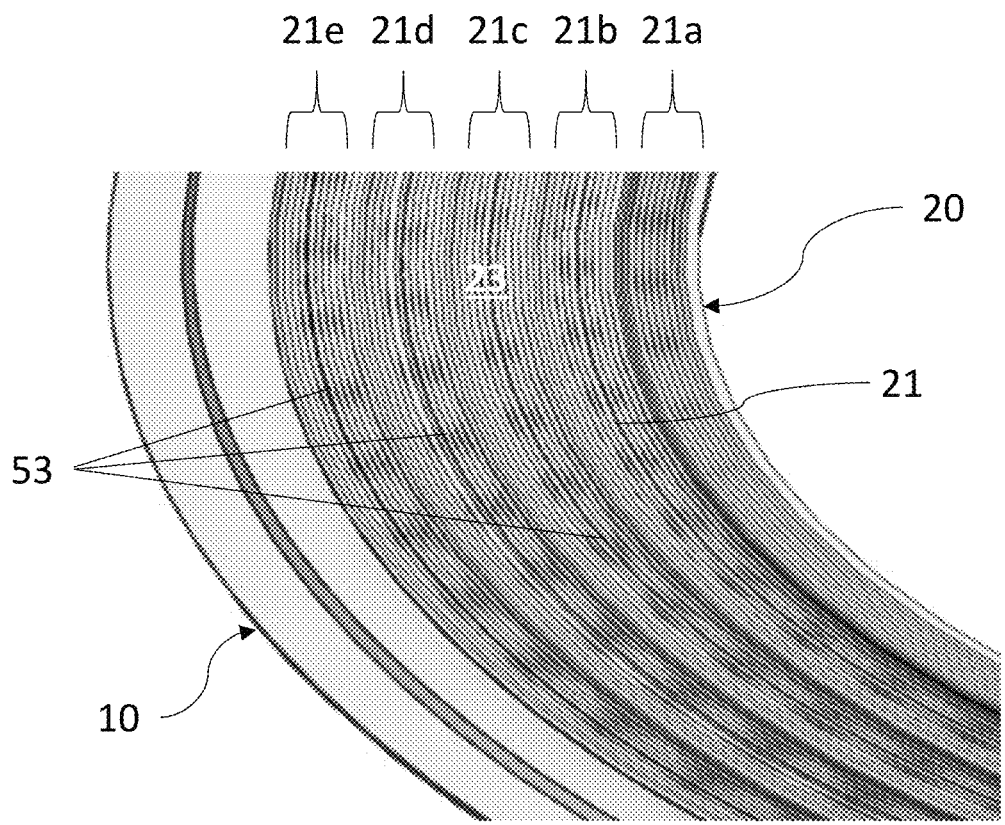
FIG. 2 is a perspective view of a portion of an optic according to some embodiments described herein.
Figure 3:
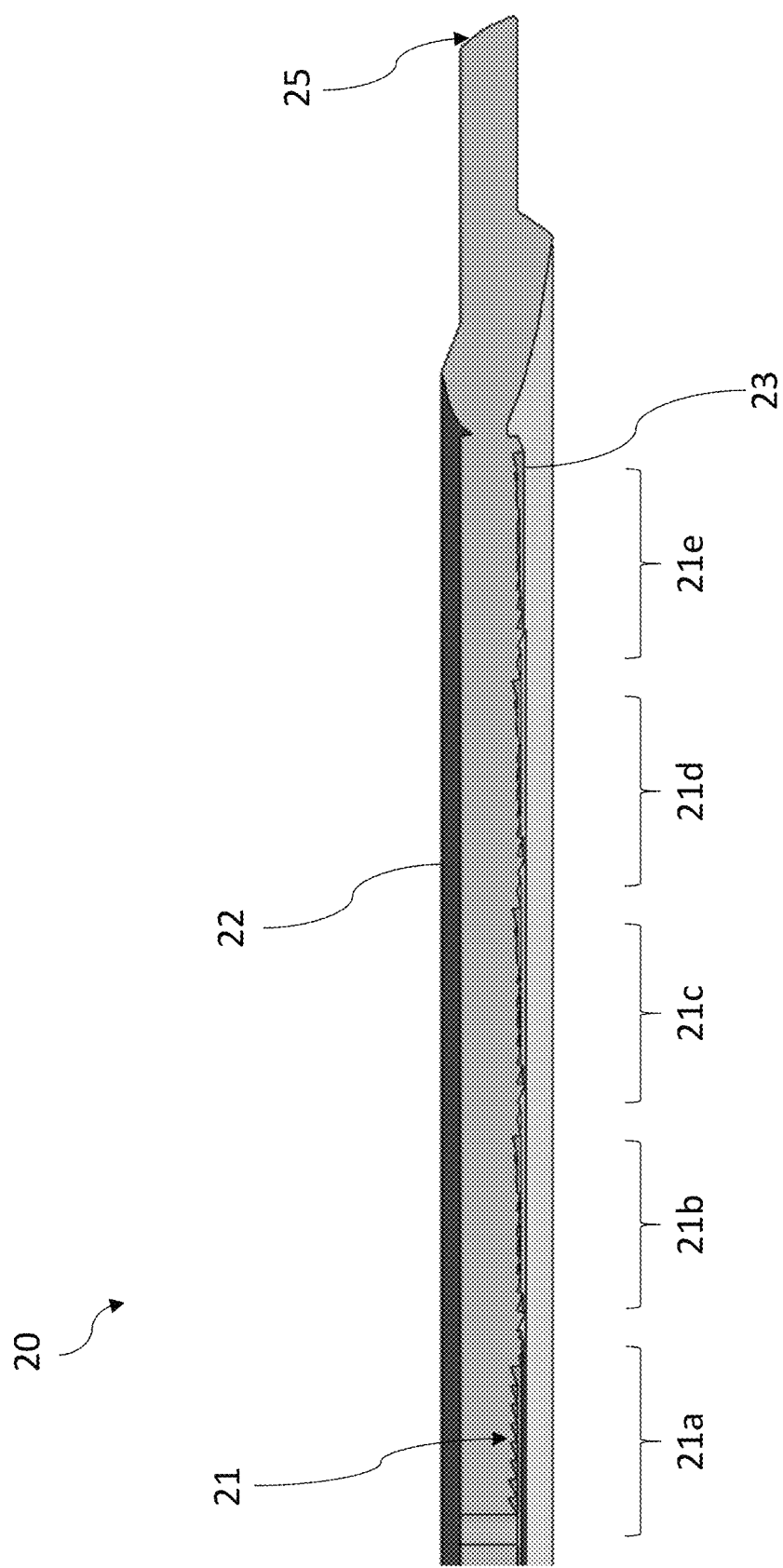
FIG. 3 is a cross-sectional view of the optic of FIG. 2.

FIG. 1 illustrates one non-limiting embodiment of a luminaire comprising an optic described herein. In FIG. 1, luminaire 1 comprises at least an optic 20 and an LED array 50. FIGS. 2 and 3 show a light emitting surface 23 and a cross-sectional view, respectively, of optic 20. In FIG. 2, an embodiment of optic 20 is shown having a plurality of micro-structures 21 arranged as concentric rings 21a-21e. Concentric rings 21a-21e can be circular, elliptical, or any other arcuate shape consistent with the objectives of this disclosure. While FIG. 2 shows optic 20 having five concentric rings, optic 20 is not limited to this, but rather, in other instances can have more or less concentric rings, such as one, two, three, four, six, seven, eight, nine, ten or more concentric rings. As illustrated in FIG. 3, optic 20 has a light receiving surface 22, and an opposite light emitting surface 23. Waveguide edge 25 is positioned on an end of optic 20, and a surface of the waveguide edge 25 extends orthogonal or oblique to the light receiving surface 22 and/or the light emitting surface 23. Concentric rings 21a-21e are formed by micro-optical structures 21, with the micro-optical structures 21 being positioned proximate to, on, or forming the light emitting surface 23. Optic 20 can additionally comprise a centrally located aperture, such as central aperture 24 shown in FIG. 1.

Figure 4:
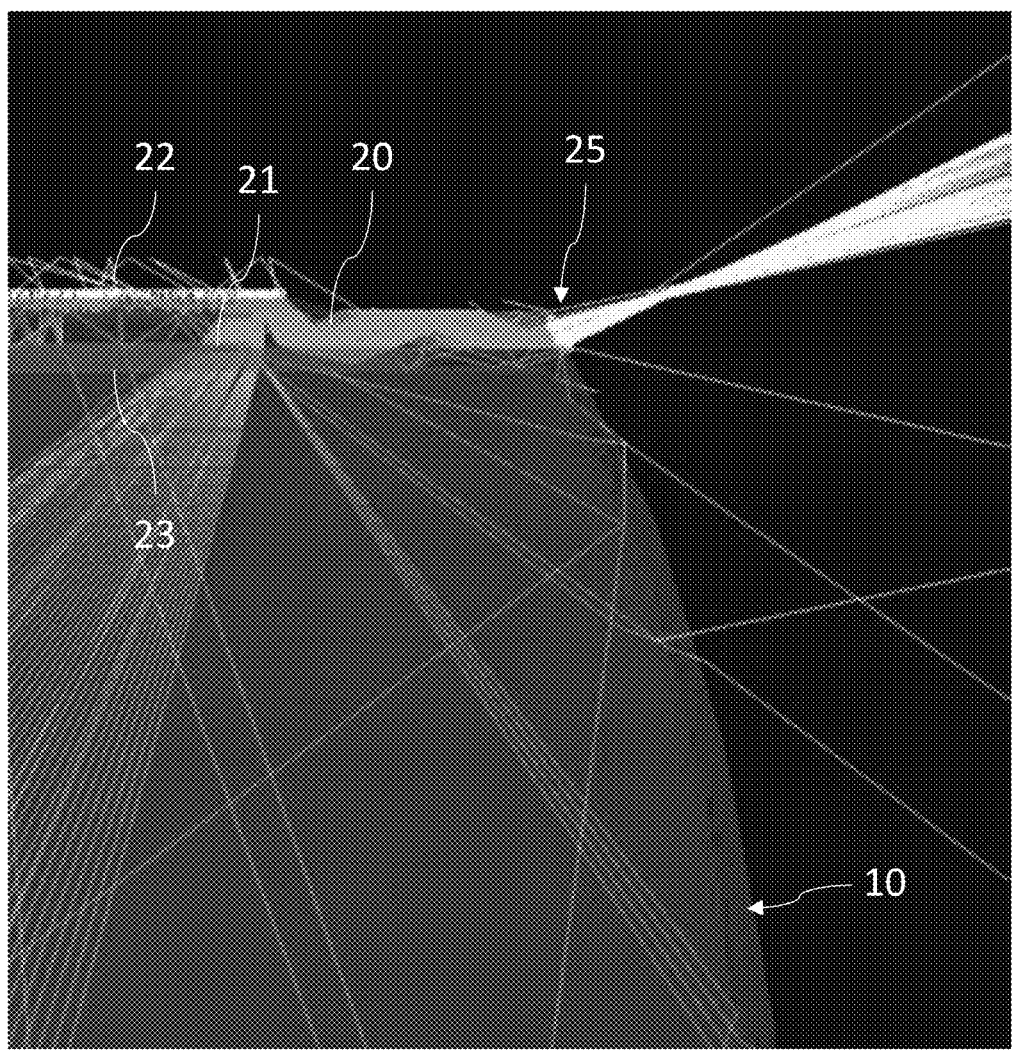
FIG. 4 is a ray diagram of up-lighting and down lighting distribution of light by an optic according to some embodiments described herein.
Figure 5A:
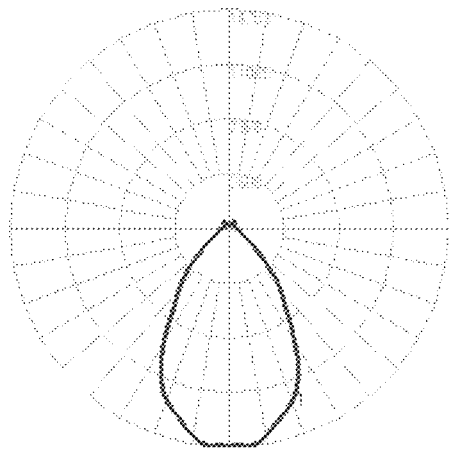
FIGS. 5A-5D illustrate lighting distribution of optics according to some embodiments described herein.
Figure 5B:
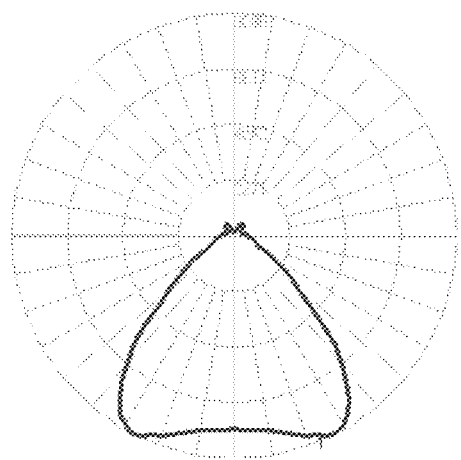
Figure 5C:
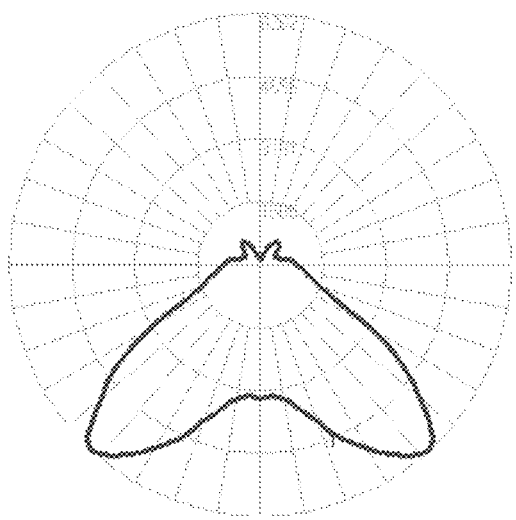
Figure 5D:
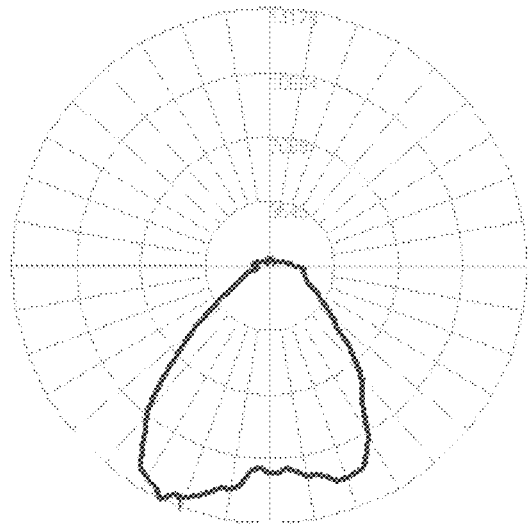

FIG. 4 shows a ray diagram of optic 20 connected to glare shield 10. Light enters optic 20 through the light receiving surface 22, and a portion of the light exits the light emitting surface 23 after interacting with the micro-optical structures 21. The micro-optical structures 21 redirect the received light in one or more down lighting distributions. The arrangement pattern of the micro-optical structures 21 can determine parameters of down lighting distribution, such as narrow (FIG. 5A), medium (FIG. 5B), wide (FIG. 5C), or asymmetric (FIG. 5D). Narrow down lighting distribution can comprise approximately up to +/−30° from nadir. Medium down lighting distribution can comprise approximately +/−31° to +/−45° from nadir. Wide down lighting distribution can comprise approximately +/−46° to +/−60° or more from nadir.

As previously described, micro-optical structures 21 can comprise micron-scale facets or prisms redirecting at least a portion of the light exiting the light emitting surface 23 in one or more directions away from an axis extending normal to the light emitting surface 23, also described as nadir. Facets of the micro-optical structures can have any geometry and design for providing desired lighting distributions via redirection of light away from the collimation axis. In some embodiments, for example, facets redirect light from the collimation axis at one or more angles greater than 1°, 3°, 5°, 10°, 15°, 20°, 25°, 30°, 35°, 40°, 45°, 50°, 55°, 60°, or greater than 60°.

In some embodiments, the micro-optical structures are arranged in an array. When in array format, the facets of the micro-optical structures can have uniform spacing or non-uniform spacing. Moreover, in some embodiments, one or more facets of the micro-optical structures can intersect the axis at an angle supporting redirection of the light by total internal reflection. For intersection angles not supporting total internal reflection, facets can comprise reflective surface coatings and/or redirect light away from the axis by refraction. In some embodiments, an array of micro-optical structures comprises any combination of micro-optical structures comprising facets redirecting light by total internal reflection, specular or diffuse reflection and/or refraction. Light redirection mechanism of individual micro-optical structures can be selected according to several considerations including, but not limited to, position of the micro-optical structure in the array, facet angle of the micro-optical structures, design of neighboring micro-optical structures, and desired lighting distribution provided by the optic.

II. Luminaire

In another aspect, luminaires are described herein comprising optics employing micro-optical structures and waveguide components for delivery of directional lighting to wall, ceiling, and/or floor surfaces using down lighting and up lighting distributions. Luminaires described herein are not limited to specific design and/or lighting application, and can provide multi-directional light distributions as high bay fixtures, low bay fixtures, or any fixture consistent with the objectives of this disclosure. In some embodiments, luminaires are mounted on the ceiling. Alternatively, in some instances, luminaires can be mounted on the floor for delivery of directional light to wall, floor, and/or ceiling surfaces. As described further herein, an optic described in Section I can assist in providing both down-lighting distributions and up-lighting distributions from luminaires described herein.

Luminaires described herein, can comprise an LED light source; and an optic covering the LED array, the optic comprising a radial arrangement of micro-optical structures for providing one or more down lighting distributions form the LED array, and a waveguide edge for providing one or more up-lighting distributions from the LED array. In the one embodiment shown in FIG. 1, luminaire 1 comprises LED array 50 light source and optic 20 covering an LED light source 50. The optic can have any construction and/or properties described in Section I herein, such as those described for optic 20.

The LED light source can be arranged in an array format, including one-dimensional LED arrays or two-dimensional LED arrays. The LED light source 50 shown generally in FIG. 1 comprises a light emitting surface 52 onto which a two-dimensional array of LEDs are positioned, as illustrated in more detail in FIGS. 2, 6A, and 6B. Generally the LED light source 50 has a shape complementary to the shape of the optic. In the example shown in FIG. 1, LED light source 50 has an annular shape corresponding to the annular shape of optic 20. In some instances, LED light source 50 has a central aperture 54. In other embodiments, the LED light source 50 has a continuous light emitting surface 52 extending across the area labeled as central aperture 54, where the area comprising central aperture 54 has additional concentric rings of LED light sources 50 with decreasing diameters.

In some embodiments, a plurality of LEDs 53 are distributed in concentric rings having a spatial position corresponding to concentric rings 21a-21e formed by micro-optical structures 21 on optic 20, such that when the optic 20 covers the LED array 50, each concentric ring of LEDs 53 is positioned proximate to at least one of the concentric rings 21a-21e of micro-optical structures 21. FIG. 2 illustrates an overlay of concentric rings of LEDs 53 with the concentric rings 21a-21e of micro-optical structures 21. In some cases, one, two, or more than two concentric rings of LEDs 51 are positioned proximate to one of the concentric rings 21a-21e of micro-optical structures 21, such that light emitted from the one, two, or more than two concentric rings of LEDs 51 is emitted from optic 20 in a down lighting distribution after interacting with micro-optical structures 21 of one of the concentric rings 21a-21e.

Figure 6A:
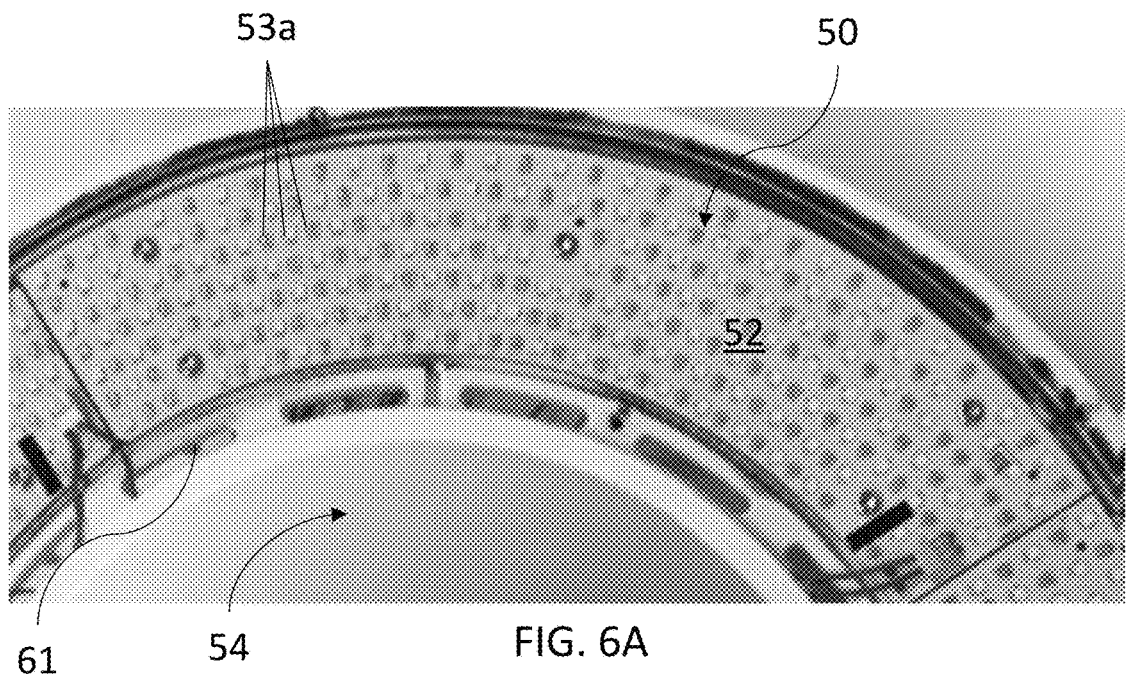
FIG. 6A illustrates symmetrical light emitting diode positioning on an LED array according to some embodiments described herein.
Figure 6B:
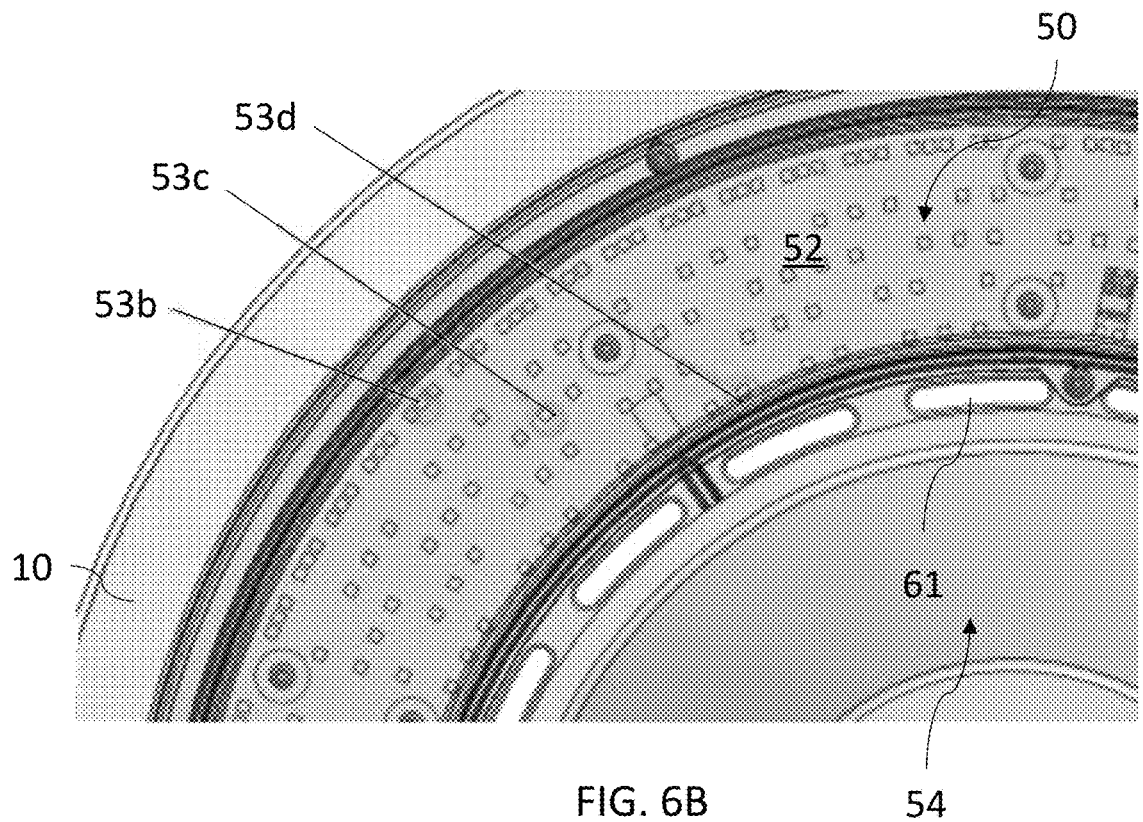
FIG. 6B illustrates asymmetrical light emitting diode positioning on an LED array according to some embodiments described herein.

In some embodiments, LED array 50 comprises a plurality of LEDs 53a positioned in concentric rings where the plurality of LEDs 53a in each concentric ring are positioned approximately equidistance from each other, as shown for example in FIG. 6A. In other embodiments, the LED array 50 comprises a plurality of LEDs 53b-53d positioned in concentric rings, where the plurality of LEDs 53b-53d in each concentric ring are positioned at varying distances from each other, as shown for example in FIG. 6B. In FIG. 6B, each of the plurality of LEDs 53b, 53c, and 53d are positioned in different concentric rings, and each concentric ring has a different LED spacing pattern and number of LEDs than the other concentric rings. Thus, depending on the application, LEDs can be clustered or spread out in different concentric rings, giving control of down lighting distribution patterns. Particularly shown in FIG. 6B is an embodiment where LEDs 53b are positioned in an outermost concentric ring in a higher density and tighter spacing than the other concentric rings. This embodiment can be advantageous in some cases because, as described in Section I, a portion of light incident on the outermost concentric ring 21e of micro-optical structures 21 may be diverted to the waveguide edge 25 and emitted therefrom in an up-lighting distribution. By decreasing the spacing between the LEDs 53b, the density (total number) of the LEDs 53b in the outermost concentric ring of LED array 50 is increased. Correspondingly, since a portion of the received light may be diverted to the waveguide edge 25 from concentric ring 21e of optic 20, by decreasing the spacing and increasing the number of LEDs in ring 21, an intensity of the down lighting distribution from optic 20 for the outermost concentric ring 21e can be maintained to be equal to one or more intensities of down lighting distributions of the other concentric rings 21a-21d. Furthermore, in some embodiments, only a portion of light incident on concentric ring 21e is diverted to waveguide edge 25, whereas light incident on concentric rings 21a-21d is passed through the micro-optical structures 21 in one more down lighting distributions without diverting the incident light to waveguide edge 25. Up-lighting and down lighting distributions of luminaires can therefore be selected independently from one another. In some embodiments, the LEDs in the LED array 50 that emit light ultimately emitted from the waveguide edge 25 as one or more up-lighting distributions, can be independently selected for the same or different spectral characteristics and features than LEDs whose light is emitted solely as down lighting distributions. For example, in some cases, one or more up-lighting distributions are of different color than the one or more down lighting distributions.

As used herein, the term "LED" can comprise packaged LED chip(s) or unpackaged LED chip(s). LED array 50 can use LEDs of the same or different types and/or configurations. The LEDs can comprise single or multiple phosphor-converted white and/or color LEDs, and/or bare LED chip(s) mounted separately or together on a single substrate or package that comprises, for example, at least one phosphor-coated LED chip either alone or in combination with at least one color LED chip, such as a green LED, a yellow LED, a red LED, and the like. The LED array can comprise phosphor-converted white or color LED chips and/or bare LED chips of the same or different colors mounted directly on a printed circuit board (e.g., chip on board) and/or packaged phosphor-converted white or color LEDs mounted on the printed circuit board, such as a metal core printed circuit board or FR4 board. In some embodiments, the LEDs can be mounted directly to the heatsink or another type of board or substrate. Depending on the embodiment, the luminaire can employ LED arrangements or lighting arrangements using remote phosphor technology as would be understood by one of ordinary skill in the art, and examples of remote phosphor technology are described in U.S. Pat. No. 7,614,759, assigned to the assignee of the present invention and hereby incorporated by reference.

In cases where a soft white illumination with improved color rendering is to be produced, each LED array 50 can include one or more blue shifted yellow LEDs and one or more red or red/orange LEDs as described in U.S. Pat. No. 7,213,940, assigned to the assignee of the present invention and hereby incorporated by reference. The LEDs can be disposed in different configurations and/or layouts as desired, for example utilizing single or multiple strings of LEDs where each string of LEDs comprise LED chips in series and/or parallel. Different color temperatures and appearances could be produced using other LED combinations of single and/or multiple LED chips packaged into discrete packages and/or directly mounted to a printed circuit board as a chip-on board arrangement. In one embodiment, the LED array 50 comprises any LED, for example, an XP-Q LED incorporating TrueWhite® LED technology or as disclosed in U.S. Pat. No. 9,818,919, granted Nov. 14, 2017, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, other LED arrangements are possible. In some embodiments, a string, a group of LEDs or individual LEDs can comprise different lighting characteristics and by independently controlling a string, a group of LEDs or individual LEDs, characteristics of the overall light out output of the luminaire can be controlled.

As shown in the embodiment of FIG. 1, luminaire 1 can further comprise one or more of a glare shield 10, an sensor assembly 30, an LED driver 40, and a heatsink 60.

Figure 8A:
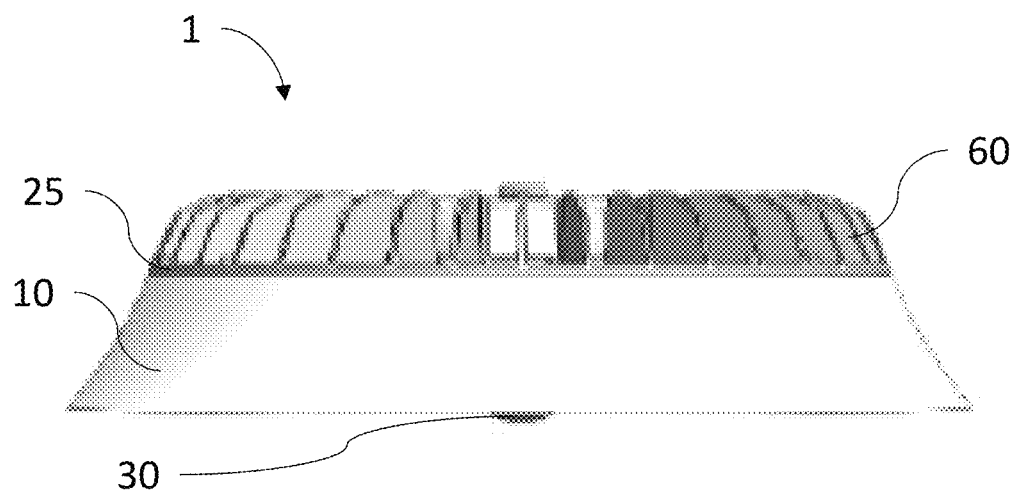
FIG. 8A is a side view of a luminaire incorporating one embodiment of a glare shield.
Figure 8B:
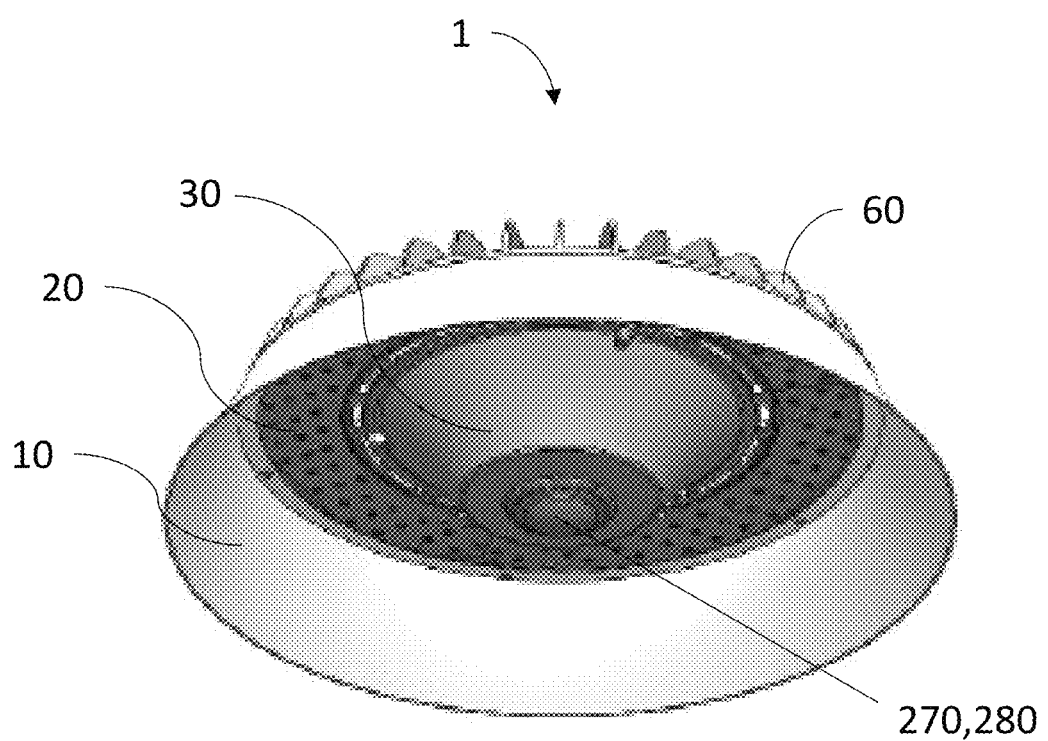
FIG. 8B is a bottom perspective view of the luminaire of FIG. 8A.

Glare shield or shroud 10 can be a monolithic element or can be formed of two or more segments having the same or differing optical properties. FIGS. 8A and 8B illustrate a side view and a bottom perspective view of a luminaire incorporating one embodiment of a glare shield. The glare shield 10 in the embodiment of FIGS. 8A and 8B can comprises a clear or diffuse material that can be formed of any desired material including clear or translucent polymeric materials, such as acrylic or polycarbonate. Alternative, glare shield 10 can be opaque, being formed from a non-translucent material, including metal.

Sensor assembly 30 can be positioned in the central aperture 24 of optic 20 and/or central aperture 54 of LED array 50, such as in the embodiments shown in FIGS. 1. Additionally, as described in more detail below, sensor assembly 30 can be positioned in a receiving space of heatsink 60 housing 63. Placement in the central aperture 24,54 can enable the sensor assembly 30 to connect directly to driver assembly 30, which can also be positioned in the central aperture 24,54. In other embodiments, the sensor assembly is separate from and not integral with the luminaire and can include networking, wired and/or wireless coupling to the luminaire. Further, the sensor assembly 30 can be recessed in the central aperture 24,54, such as in housing 63, precluding light from the LED array 50 from directly striking the sensor assembly 30. The sensor assembly 30 can have one or more sensors and/or functionalities including, but not limited to, low level light imaging and/or occupancy detection. In other embodiments, other sensor assemblies can be used.

In some embodiments, sensor assembly 30 can incorporate an effective motion detection system based upon a visible light focal plane array such as a color or monochrome CMOS camera, in conjunction with imaging lens and digital processing. Physically, such motion detection sensor may closely resemble a camera module from a smartphone. Appropriate sensors may include those made by the Aptina division of On Semiconductor, by Ominivsion or others. Appropriate lens assemblies may result in a sensor module field of view from 70 degrees to 120 degrees. Relatively inexpensive camera modules with resolution as low as (640×480) or (1290×960) can deliver fundamental ground sampled resolution as small as 2 cm from a height of 20 feet, more than sufficient to detect major and minor motions of persons or small industrial vehicles such as forklifts.

For operation in zero light environments, sensor assembly 30 can comprise supplemental illumination provided by optional features, such as a low-power near IR LED illuminator or a low power mode of the luminaire itself where the luminaire remains on at 0.5% to 10.0% of full power.

Figure 9:
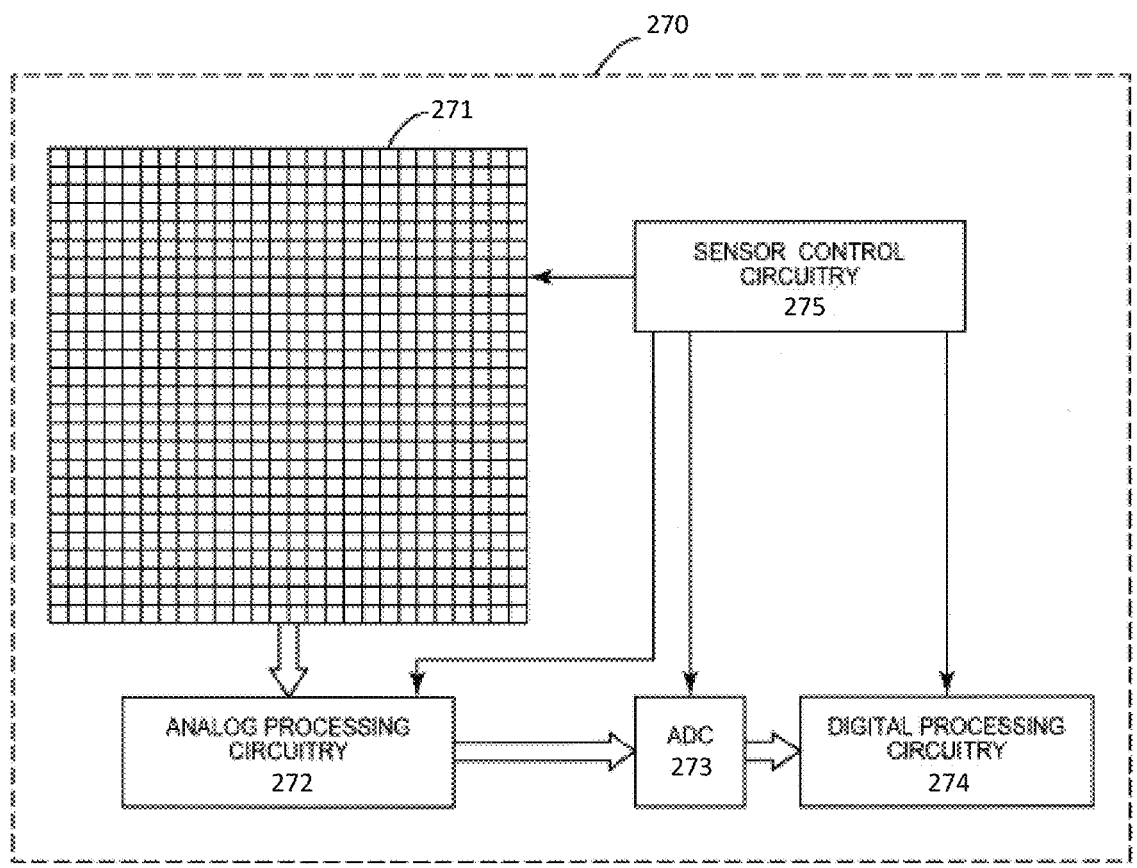
FIG. 9 illustrates components of an image sensor according to some embodiments described herein.

In some embodiments, sensor assembly 30 can comprise an image sensor, as well as an optional a focal plane array and one or more optics. The image sensor, for example, can be a charge-coupled device (CCD), complimentary metal-oxide semiconductor (CMOS) or any other type of image sensor. Suitable image sensors can include those made by the Aptina division of On Semiconductor, by Omnivision or others. The image sensor, in some embodiments, is positioned to capture a field of view corresponding or substantially corresponding to an area that is illuminated by the luminaire. Details of a CMOS-based image sensor are illustrated in the non-limiting embodiment of FIG. 9. While a CMOS-based image sensor 270 is illustrated, those skilled in the art will appreciate that other types of image sensors, such as CCD-based sensors, can be employed. The image sensor 270 generally includes a pixel array 271, analog processing circuitry 272, an analog-to-digital converter (ADC) 273, digital processing circuitry 274 and sensor control circuitry 275. In operation, the pixel array 271 will transform light that is detected at each pixel into an analog signal and pass the analog signal for each pixel of the array 271 to the analogy processing circuitry 272. The analog processing circuitry 272 will filter and amplify the analog signals to create amplified signals, which are converted to digital signals by the ADC 273. The digital signals are processed by the digital processing circuitry 274 to create image data corresponding to the captured image.

The sensor control circuitry 275 will cause the pixel array 271 to capture an image in response to an instruction, for example, from a control system. The sensor control circuitry 275 controls the timing of the image processing provided by the analog processing circuitry 272, the ADC 273 and the digital processing circuitry 274. The sensor control circuitry 275 also sets the image sensor's processing parameters, such as the gain and nature of filtering provided by the analog processing circuitry 272 as well as the type of image processing provided by the digital processing circuitry 274.

Figure 10:
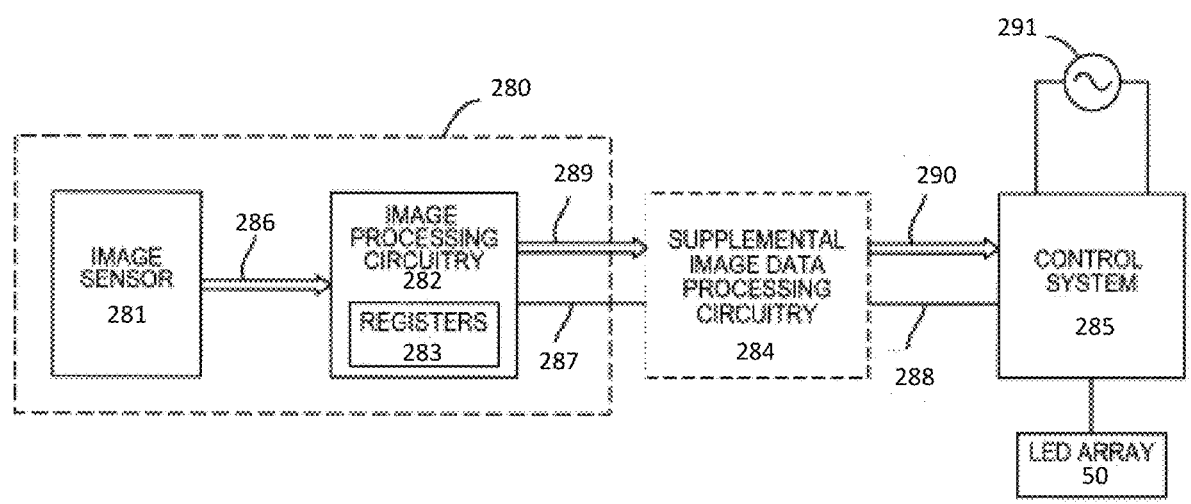
FIG. 10 is a block diagram illustrating electronic components of a luminaire according to some embodiments described herein.

FIG. 10 illustrates an electrical block diagram of a luminaire employing sensor module 280 in the sensory assembly 30. The sensor module 280 comprising an image sensor 281 according to some embodiments. The sensor module 280 also comprises image processing circuitry 282, which in turn includes a number of registers 283, optional supplemental image data processing circuitry 284 and a control system 285. The LED array 50 can be electronically connected to the control system 285 in some instances. The sensor module 280 can be a system on chip (SoC) in which the image sensor 281 and processing circuitry 282 are integrated onto a single chip. The supplemental image processing circuitry 284 can be provided either together or separately from the sensor module 280. The supplemental image data processing circuitry 284 can be used to offload computations related to image data and/or derived image data that cannot be processed by the image processing circuitry 282.

In operation, the image sensor 281 is configured to capture images as described above. The data from these images is sent to the image processing circuitry 282. In the embodiment of FIG. 10, the image data is sent via a high speed bus 286. The image processing circuitry 282 can perform a number of operations on the imaged data, including filtering and adjusting the image data. In some embodiments, the image processing circuitry can address signal generated by light reflected from one or more optics of the luminaire and/or signal generated by other environmental artifacts. For example, the image processing circuitry can remove or exclude signal generated by light reflected from a glare shield employed in the luminaire architecture.

Further, the image processing circuitry 282 can determine derived image data from the image data. In general, the derived image data is a downsampled form of the image data. The derived image data can be provided in the normal course of operation of the sensor module 280. The supplemental image data processing circuitry 284 can perform one or more computations on the derived image data to determine an ambient light level and/or occupancy event. However, these computations can also be performed directly by the control system 285. Using the derived image data can allow the supplemental image data processing circuitry to use a first low-speed bus 287 to communicate with the image processing circuitry 282. Similarly, it can also enable the control system to communicate with a second low speed bus 288 with the supplemental image data processing circuitry 284 and/or directly with the image processing circuitry 282. This is due to the fact that the derived image data is downsampled when compared to the actual image data and, therefore, can be transferred quickly when compared to the actual image data. In situations wherein the derived image data is insufficient to accurately characterize the area surrounding the luminaire, the full image data can be transferred from the image processing circuitry 282 to the supplemental image data processing circuitry 284 via a second high speed bus 289 for further review. The image data can then be processed by the supplemental image data processing circuitry 284 and the necessary data sent via the second low speed bus 288 to the control system 285, or the full image data can also be sent to the control system 285, either directly from the image processing circuitry 282 via a third high speed bus 290 or indirectly from the supplemental image data processing circuitry 284 via the third high-speed bus 290.

The first high-speed bus 286, the second high-speed bus 289 and the third high-speed bus 290 can be a universal serial bus (USB), a peripheral component interconnect (PCI), an external serial advanced attachment (eSATA) bus of the like. The first low-speed bus 287 and second low-speed bus 288 can be any number of low-speed buses known in the art. For example, the first low-speed bus 287 and second low-speed bus 288 can be an RS-232 bus, a serial peripheral interface (SPI), an $I^2C$ bus or the like.

The control system 285 can use the image data and/or the derived image data to adjust one or more light output characteristics of the LED array 50. For example, the control system 285 can use the image data and/or derived image data to adjust color temperature, light intensity, color, vividness or the like of the light output by the LED array 50. An alternating current (AC) power source 291 can provide power for the control system 285 and LED array 50. Additional features of a sensor module comprising an image sensor and associated image processing are further described in U.S. patent application Ser. No. 14/928,592 Nov. 5, 2015, entitled "Lighting Fixture with Image Sensor Module" (Cree docket no. P2524US1), which is incorporated herein by reference in its entirety.

The image sensor can employ an optical assembly of any construction not inconsistent with the objectives of the present invention. In some embodiments, the optical assembly is a multi-element structure. For example, the optical assembly can generally comprise 3-6 optical elements. In some embodiments, the optical assembly of the image sensor does not include an infrared cut-off filter for excluding infrared radiation, including near-infrared radiation, from reaching the focal plane array. Exclusion of the IR cut-off filter can enhance the sensitivity of the image sensor for various sensing operations including occupancy detection at extremely low light levels. Alternatively, an IR cut-off filter can be employed in the optical assembly of the image sensor.

The image sensor can have any field of view not inconsistent with the objectives of the present invention. As described above, the image sensor can have a field of view corresponding or substantially corresponding to an area that is illuminated by the luminaire. In some embodiments, the image sensor can have a field of view from 70 degrees to 120 degrees or 100 degrees to 110 degrees. The image sensor field of view can also exclude light reflected by one or more optics of the luminaire. For example, the image sensor field of view can exclude light reflected from a glare shield employed by the luminaire. In some embodiments, image sensor field of view is restricted by one or more masking or baffle structures to exclude light reflected by optic(s) of the luminaire. Alternatively, the image processing circuitry of the image sensor addresses signal generated by light reflected by luminaire optic(s). The image processing circuitry, for example, can exclude or subtract such signal during processing of image data. In further embodiments, masking or baffle structures are used in conjunction with image processing techniques to address light reflected by one or more luminaire optics.

In various embodiments described herein various smart technologies may be incorporated in luminaires described herein, such as in sensor assembly 30, as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782, 096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," application Ser. No. 61/932,058, filed Jan. 27, 2014, which is incorporated by reference herein in its entirety.

LED driver 40 can include power or driver circuitry having a buck regulator, a boost regulator, a buck-boost regulator, a fly-back converter, a SEPIC power supply or the like and/or multiple stage power converter employing the like, and may comprise a driver circuit as disclosed in U.S. Pat. No. 9,791,110, granted Oct. 17, 2017, entitled "High Efficiency Driver Circuit with Fast Response" by Hu et al. (Cree docket no. P2276US1) or U.S. Pat. No 9,303,823, granted Apr. 5, 2016, entitled "SEPIC Driver Circuit with Low Input Current Ripple" by Hu et al. (Cree docket no. P2291US1), the entirety of these applications being incorporated by reference herein. The circuit may further be used with light control circuitry that controls color temperature of any of the embodiments disclosed herein, such as disclosed in U.S. patent application Ser. No. 14/292,286, filed May 30, 2014, entitled "Lighting Fixture Providing Variable CCT" by Pope et al. (Cree docket no. P2301 US1), the entirety of this application being incorporated by reference herein. Additionally, any of the embodiments described herein can include driver circuitry disclosed in U.S. Pat. No. 9,730,289, granted Aug. 8, 2017, entitled "Solid State Light Fixtures Having Ultra-Low Dimming Capabilities and Related Driver Circuits and Methods" (Cree docket no. P2597US1), the entirety of this application being incorporated herein by reference.

In some embodiments, LED driver 40 can comprise a driver assembly disclosed in U.S. Pat. No. 10,234,127, granted Mar. 19, 2019, entitled "LED Luminaire Having Enhanced Thermal Management" by Bendtsen et al. (Cree docket no. P2532US2), the entirety of this application being incorporated by reference herein.

Additionally, LED driver 40 can include the smart lighting control technologies disclosed in U.S. Patent Application Ser. No. 62/292,528, entitled "Distributed Lighting Network" (Cree docket no. P2592US1), assigned to the same assignee as the present application, the entirety of this application being incorporated herein by reference.

Any of the embodiments disclosed herein may be used in a luminaire having one or more communication components forming a part of the light control circuitry, such as an RF antenna that senses RF energy. Such communication components can in some instances be included in the LED driver 40 or in a separate driver communicatively connected to LED driver 40. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry can include at least one of a network component, an RF component, a control component, and one or more sensors. A sensor, such as a knob-shaped sensor, may provide an indication of ambient lighting levels and/or occupancy within the room or illuminated area. Other sensors are possible, and a sensor may be integrated into the light control circuitry as described herein, such as those described with reference to sensor assembly 30.

Figure 11A:
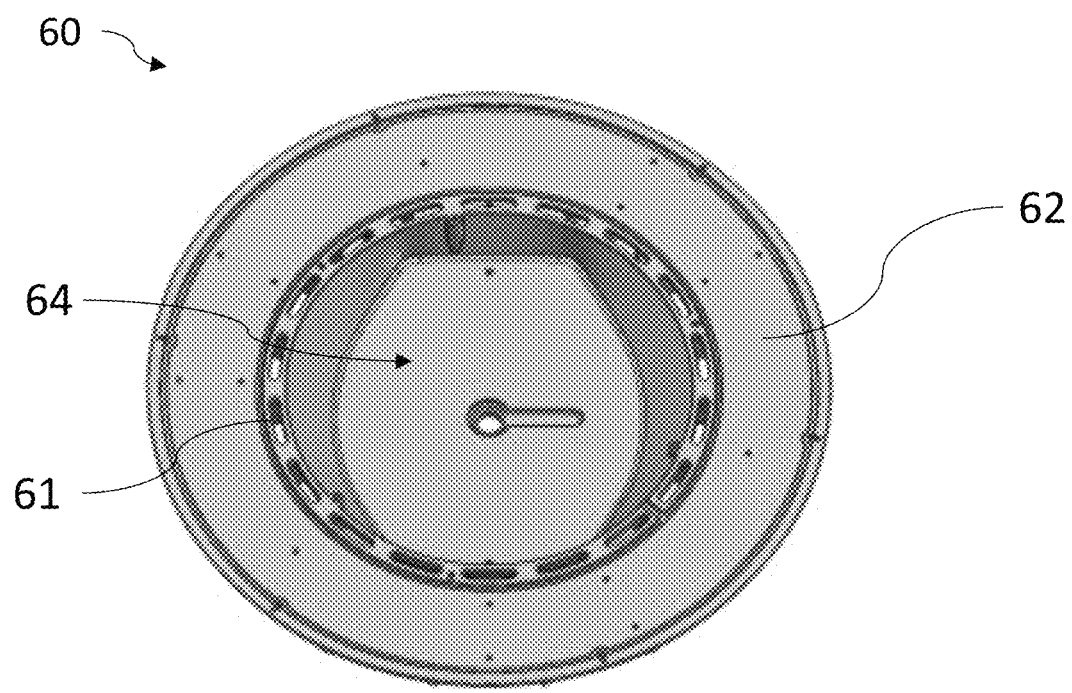
FIG. 11A is a bottom view of a heatsink assembly having a body and a housing according to some embodiments described herein.
Figure 11B:
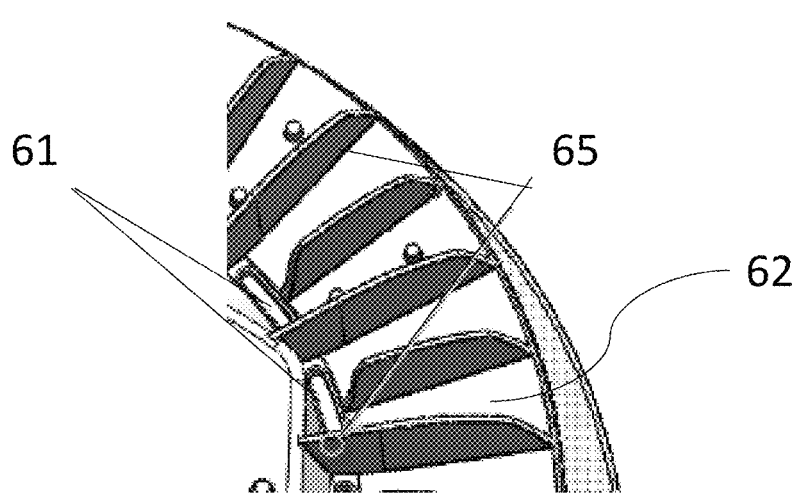
FIG. 11B is a partial perspective view of a top of a heatsink assembly having finned structures and vents according to some embodiments described herein.
Figure 11C:
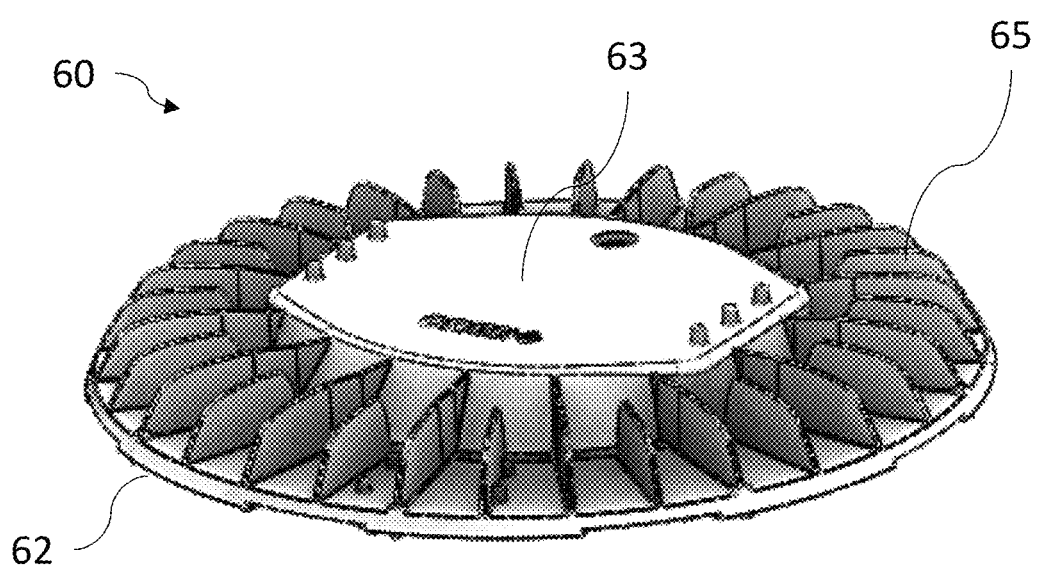
FIG. 11C is a perspective view of a heatsink assembly according to some embodiments described herein.

One embodiment of LED heatsink 60 is shown in particular detail in at least FIGS. 11A-11C, comprising a base having a radially extending mounting body 62, a central aperture 64 formed in the mounting body 62, and a housing 63 positioned proximate to the central aperture 64, and being connected, coupled, or attached to the mounting body 62. Housing 63 can comprise a component receiving space into which LED driver 40, various sensor components, backup battery, and the like can be positioned and housed. The component receiving space is generally denoted by reference 64 in FIG. 11A. In some embodiments, housing 63 and LED driver 40 can be combined into one unit to form a driver assembly described in U.S. Pat. No. 10,234,127, granted Mar. 19, 2019, entitled "LED Luminaire Having Enhanced Thermal Management" by Bendtsen et al. (Cree docket no. P2532US2), which has already been incorporated by reference in its entirety herein. In some embodiments, sensor assembly 30 can connect, attach, or be coupled to mounting body 62 or housing 63.

Finned structures 65 are positioned around central aperture 64. In some embodiments, finned structures 65 are positioned on an upward facing surface of mounting body 62, as particularly illustrated in FIGS. 7, 11B and 11C. Finned structures 65 can have any desired design including single fins, branched fins, curved fins and combinations thereof. The finned structures 65, housing 63, and body 62 can be independently formed of any suitable thermally conductive material.

In some embodiments, heatsink 60 can further comprise a plurality of cooling vents 61. As shown for example in the embodiments of at least FIGS. 6A, 6B, 11A, and 11B, cooling vents 61 can be positioned at an interface of where housing 63 and body 62 of heatsink 60 converge. In some instances, the plurality of cooling vents 61 are positioned proximate to the LED driver assembly 40. The cooling vents 61 permits an envelope of cooler air to flow between the finned structures 65 cooling the LED array 50, and the housing 63, sensor assembly 30, and/or driver assembly 40. This envelope of cooler air can establish a forced air boundary or barrier separating the convective cooling of the housing 63, sensor assembly 30, and/or driver assembly 40 from the convective cooling of the LED array 50. Little to no heated air from the LED array 50 contacts the heatsink 60 of the driver assembly 11, in some embodiments. Dimensions of the air envelope can be established and controlled by several considerations including, but not limited to, fin height and fin spacing of the heatsink 60, height of the driver assembly 40, housing 63, and/or distance of the finned structures 65 from the central aperture of the luminaire. For example, the ratio of driver assembly height to fin height should be sufficiently low to prevent warm or hot air from the heatsink 60 from re-converging on upper portions of the driver assembly 40, such as portions proximate the housing 63. In some embodiments, the ratio of driver assembly height to fin height is less than 1:5. Moreover, fins of the heatsink should have sufficient spacing to facilitate pulling air from the central aperture of the luminaire into the heatsink for cooling of the LED array. In some embodiments, the heatsink has a minimum fin-to-fin spacing of 0.180". In some embodiments, fin spacing of the heatsink is uniform. In other embodiments, fin spacing can be varied according to desired flow characteristics of the heatsink. Additionally, altering the distance of the fins from the central aperture of the luminaire can affect size of the air envelope. For example, in some embodiments, increasing the distance of the heatsink fins from the central aperture increases the size of the air envelope. One or more fins of the heatsink can also have geometry or design for managing dimensions of the air envelope. heatsink fins, in some embodiments, have curvature or design for directing convective air currents away from the housing 63, sensor assembly 30, and/or driver assembly 40. Such embodiments can further preclude or inhibit re-convergence of warm or hot air from the heatsink 60 on the housing 63, sensor assembly 30, and/or driver assembly 40 and enable higher values for the ratio of housing 63, sensor assembly 30, and/or driver assembly 40 height to fin height.

In some embodiments, the finned structures 65, housing 63, and body 62 are formed of a material having thermal conductivity of 3-300 W/m K. In some embodiments, finned structures 65, housing 63, and/or body 62 are fabricated from aluminum, steel sheet metal or other metal/alloy. For example, the finned structures 65, housing 63, and/or body 62 can be fabricated from aluminum or other metal by die-casting. In some embodiments, the finned structures 65 are fabricated independent of the body 62 and subsequently coupled to the body 62 by one or more techniques including fasteners, soldering, or bonding by adhesive. Such embodiments provide significant design freedom regarding composition and density of the finned structures 65. Similarly, in some instances, body 62 and housing 63 are fabricated independently from each other, and subsequently coupled or connected by one or more techniques including fasteners, soldering, or bonding by adhesive. In some embodiments, the finned structures 65, housing 63, and body 62 are formed of the same material. In other embodiments, the finned structures 65, housing 63, and body 62 are formed of differing materials. For example, the finned structures 65 can be an extruded polymeric material or aluminum alloy, the house 63 a stamped sheet metal, and the body 62 a cast metal. Design and structure of the LED heatsink 60 can be governed by several considerations, including cooling requirements for the LED array and cost factors.

Figure 12:
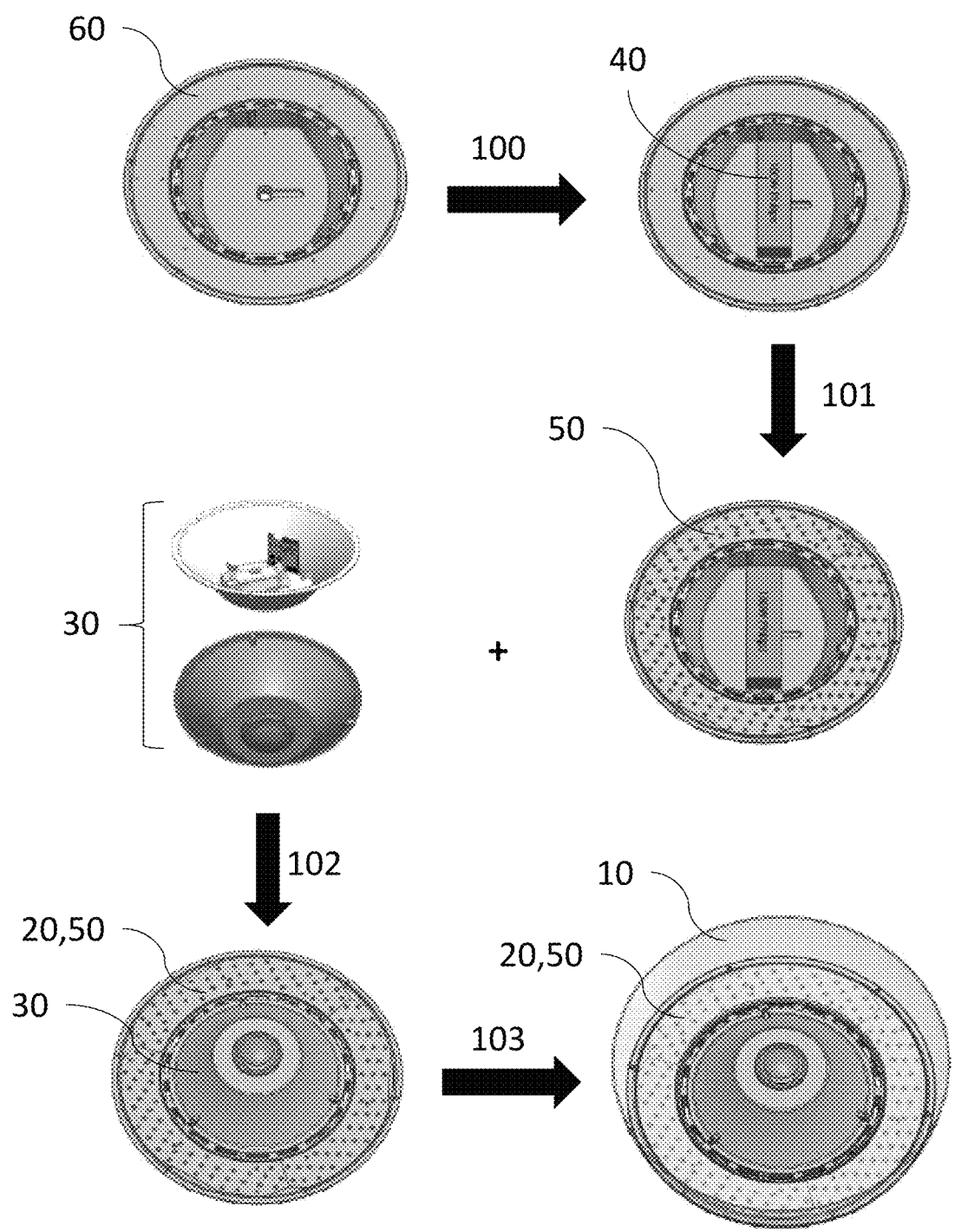
FIG. 12 illustrates a single orientation assembly process of a luminaire according to some embodiments described herein.

Assembly of one luminaire embodiment is shown in FIG. 12. First, heatsink 60 is placed with the heating fins 65 facing downwards, and a light emitting end facing upward. Then the driver 40 and other electrical components are secured on a surface of the light emitting end of heatsink 60 at step 100, such as in housing 63 in the central aperture 64. LED assembly/array 50 is secured to the surface of the light emitting end of heatsink 60, such that the driver 40 and other electrical components are positioned within or proximate to the central aperture 54 of the LED array 50 at step 101. At step 102, sensor assembly 30, including any communication modules or features described herein, are assembled and positioned within or proximate to the central aperture 54 of the LED array 50, and mechanically connected to heatsink 60 through fasteners and/or adhesives. Finally, optic 20 is positioned over LED array 50 at step 103. Glare shield 10 can optionally be connected to the heatsink 60 at step 103. One particular advantage of the assembly process illustrated in FIG. 12, is that the assembly of the luminaire is a single orientation assembly, meaning that the entire luminaire can be assembled from one direction, in contrast to other convention assembly methods that require the assembly to be assembled from both the light emitting end of heatsink 60 and the opposite top end of heatsink 60. Moreover, disassembly of the luminaire can also be performed from the light emitting end, allowing sensor assemblies, LED drivers, and LED arrays to readily and easily be replaced or upgraded without removal of the luminaire from its installation.

Figure 7:
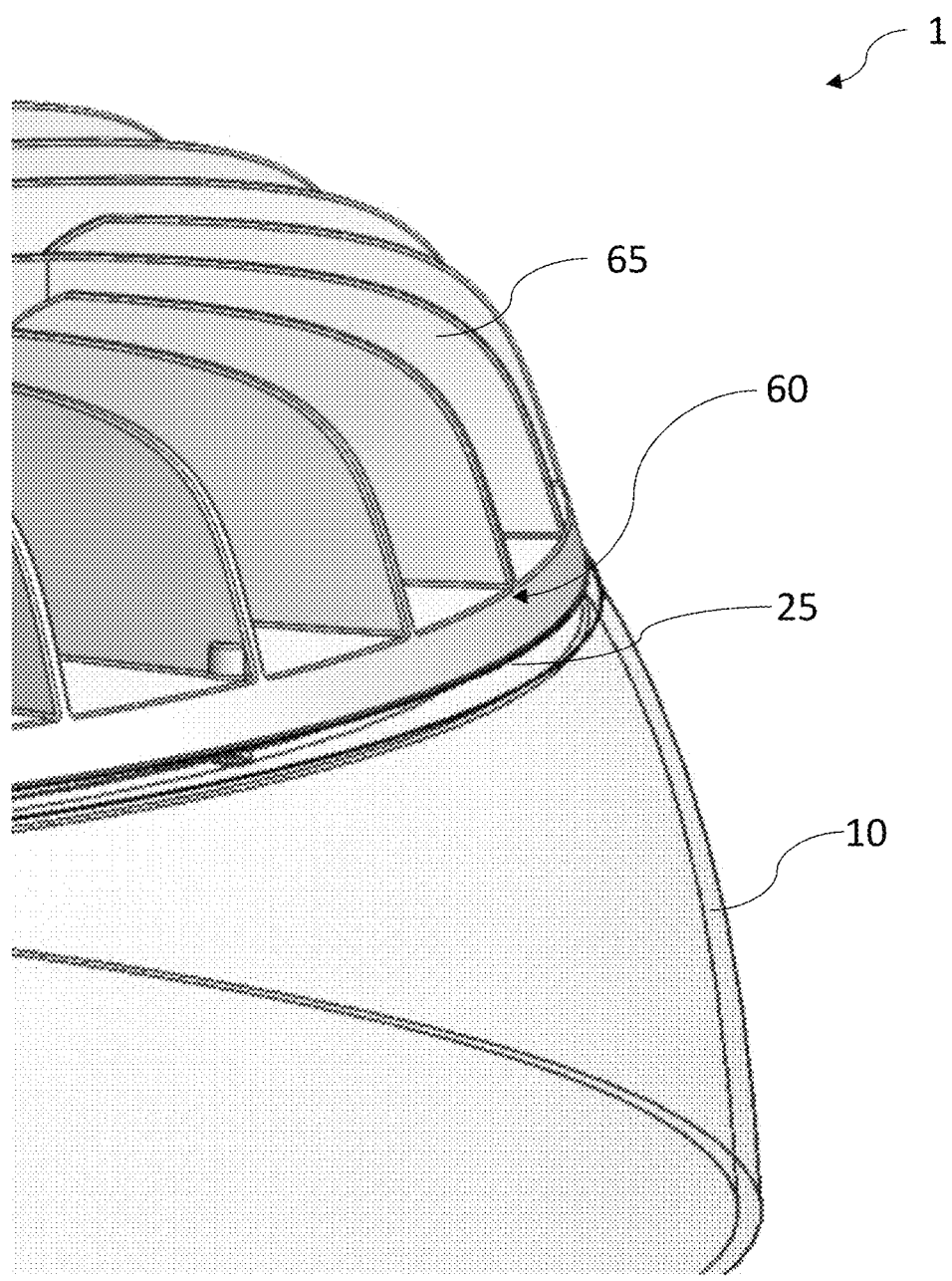
FIG. 7 is a partial perspective view of an assembled luminaire having an exposed waveguide edge according to some embodiments described herein.

FIG. 7 shows a partial perspective view of an assembled luminaire 1. As shown, the waveguide edge 25 of optic 20 is positioned between glare shield 10 and heatsink 60. When optic 20 receives light from the LED array 50, light can be emitted from the waveguide edge 25 in one or more up-lighting distributions, such as those shown in the ray diagram of FIG. 4.

Figure 13:
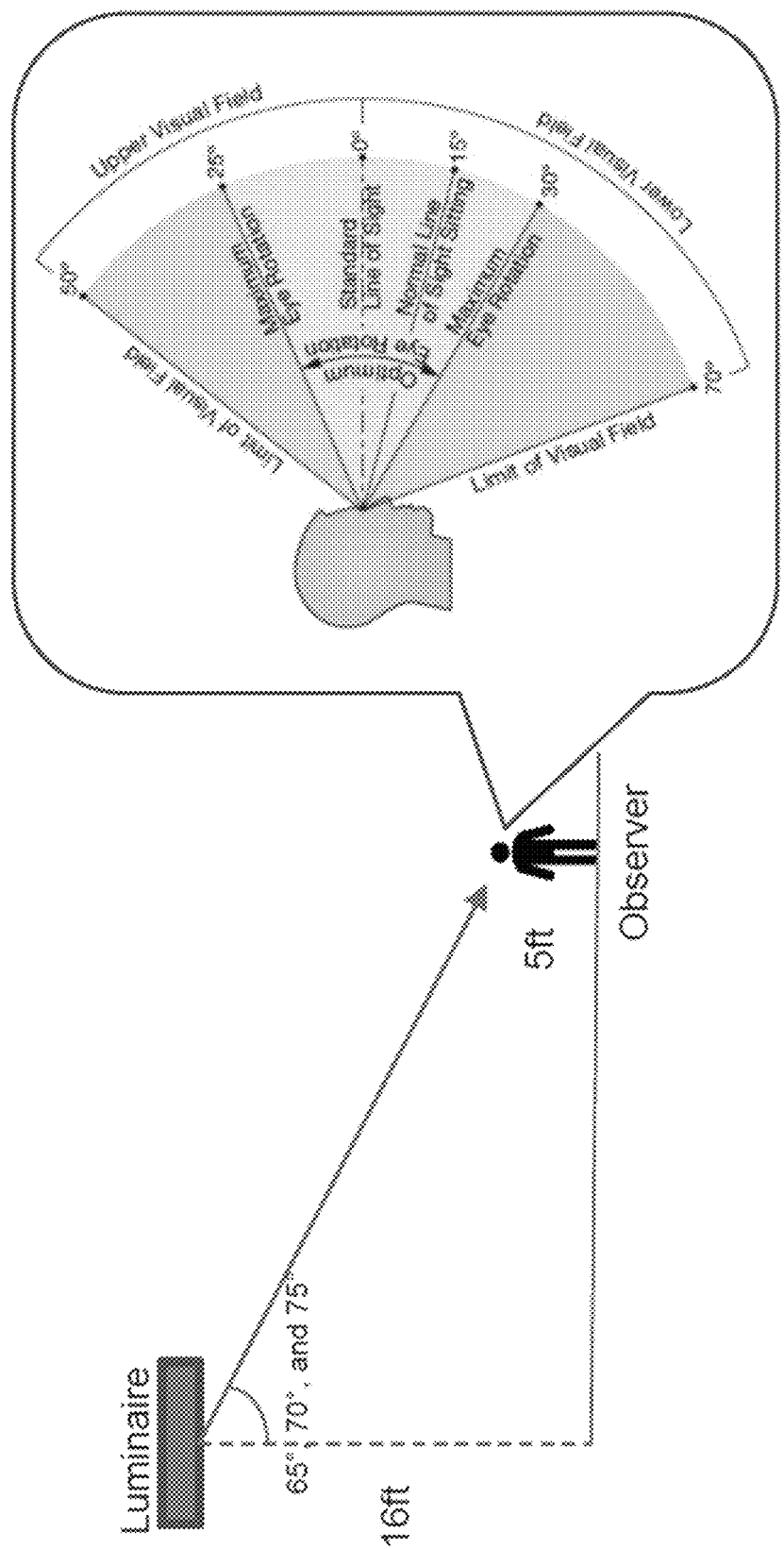
FIG. 13 illustrates glare characterized at viewing angles of 65 degrees, 70 degrees, and 75 degrees relative to nadir.

Luminaires described herein can in some instances, can have a reduced glare compared to traditional luminaires, where glare is characterized as a ratio of max luminance value to a total lumen output of the luminaire at a given viewing angle. For example, as shown in FIG. 13, the glare can be characterized at viewing angles of 65 degrees, 70 degrees, and 75 degrees relative to nadir. As described herein, the ratio of max luminance value to the total lumen output is determined by near field photometry rather than far field photometry at a range of less than eight times a distance of a light source size. Some luminaires described herein have a ratio of max luminance at 65 degrees from nadir to total lumen output from the luminaire that is less than 9, less than 8, less than 7, less than 6, less than 5, less than 4, less than 3, or less than 2. In some embodiments, luminaires described herein have a ratio of max luminance at 70 degrees from nadir to total lumen output from the luminaire that is less than 7, less than 6, less than 5, less than 4, less than 3, or less than 2. In some cases, luminaires described herein have a ratio of max luminance at 75 degrees from nadir to total lumen output from the luminaire that is less than 6, less than 5, less than 4, less than 3, or less than 2. In one non-limiting example, a luminaire described herein can comprise a LED array, and an optic covering the LED array, the optic comprising a radial arrangement of micro-optical structures providing a ratio of max luminance at 65 degrees from nadir to total lumen output from the luminaire of less than 7.

In some embodiments, luminaires described herein can have a luminance at 65 degrees from nadir is less than $3 \times 10^5$ cd/m$^2$, less than $2.5 \times 10^5$ cd/m$^2$, less than $2 \times 10^5$ cd/m$^2$, less than $1 \times 10^5$ cd/m$^2$, or less than less than $9 \times 10^4$ cd/m$^2$.

III. Lighting Systems

In another aspect, lighting system are contemplated comprising a plurality of luminaires arranged over or positioned across an area enclosed by walls, the luminaires being any luminaire embodiment described in Section II herein, wherein the optic of luminaires adjacent to the walls differs from the optic of luminaires over a central region of the area. For example, in some embodiments the optic of luminaires adjacent to the walls provides an asymmetric down lighting distribution, and the optic of luminaires over the central region provides a symmetric down lighting distribution. The asymmetric down lighting distribution of the luminaires adjacent to walls can, in some cases, direct a portion of the down lighting distribution onto the adjacent walls to provide even or uneven lighting on the walls (i.e. wall wash lighting). Moreover, one or more of the luminaires in the lighting system can provide up-lighting distributions through the waveguide edge of the optic to illuminate dark areas of the ceilings and corners of the area to reduce the cave-like effect.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An optic for a light emitting diode (LED) array comprising:
   a radial arrangement of optical structures for providing one or more down lighting distributions with a first portion of light received from the LED array; and
   a radially extending waveguide edge providing one or more up-lighting distributions with a second portion of light received from the LED array.

2. The optic of claim 1, wherein the optical structures are arranged in concentric rings.

3. The optic of claim 2, wherein the optical structures vary in number and/or dimension between the concentric rings.

4. The optic of claim 1, wherein the optical structures are micro-scale optical structures.

5. The optic of claim 1, wherein the optical structures are Fresnel structures.

6. The optic of claim 1, wherein single optical structures are positioned over each LED in the LED array.

7. The optic of claim 1, wherein the second portion of light is 5% to 20% of total light produced by the LED array.

8. The optic of claim 1, wherein the optic is a single piece.

9. The optic of claim 1, wherein the optic comprises two or more pieces.

10. The optic of claim 9, wherein each of the two or more pieces comprises the radially extending waveguide edge.

11. The optic of claim 1, wherein the up-lighting distribution has an angle of 5-30 degrees from a plane normal to nadir.

12. A luminaire comprising:
    a light emitting diode (LED) array; and
    an optic covering the LED array, the optic comprising a radial arrangement of optical structures for providing one or more down lighting distributions with a first portion of light received from the LED array, and a radially extending waveguide edge providing one or more up-lighting distributions with a second portion of light received from the LED array.

13. The luminaire of claim 12, wherein the optical structures are arranged in concentric rings.

14. The luminaire of claim 13, wherein the optical structures vary in number and/or dimension between the concentric rings.

15. The luminaire of claim 12, wherein the optical structures are micro-scale optical structures.

16. The luminaire of claim 12, wherein single optical structures are positioned over each LED in the LED array.

17. The optic of claim 12, wherein the optic comprises two or more pieces.

18. The optic of claim 17, wherein each of the two or more pieces comprises the radially extending waveguide edge.

* * * * *